United States Patent [19]

Hirota

[11] Patent Number: 5,700,503

[45] Date of Patent: Dec. 23, 1997

[54] FOOD SUPPLEMENT COMPRISING A MINERAL COMPLEX AND A METHOD FOR ITS PRODUCTION

[75] Inventor: Kunio Hirota, Sohka, Japan

[73] Assignee: M.P.G. Co. Ltd., Tokyo, Japan

[21] Appl. No.: 626,327

[22] Filed: Apr. 2, 1996

[51] Int. Cl.⁶ .................................................. A23L 1/304
[52] U.S. Cl. ....................... 426/74; 426/456; 426/479; 426/481; 426/648
[58] Field of Search ................ 426/74, 648, 456, 426/479, 481

[56] References Cited

U.S. PATENT DOCUMENTS 3,982,036  9/1976  Amin ........................... 426/74
4,540,584  9/1985  Someya ........................ 424/156

FOREIGN PATENT DOCUMENTS

| 57-125676 | 8/1982 | Japan . |
| 233889 | 10/1984 | Japan . |
| 103786 | 5/1988 | Japan . |
| 205509 | 6/1993 | Japan . |
| 304718 | 11/1993 | Japan . |

*Primary Examiner*—Helen Pratt
*Attorney, Agent, or Firm*—Michael D. Bednarek; Kilpatrick Stockton LLP

[57] ABSTRACT

A food supplement comprising a mineral complex obtained from coral by soaking it in a solution of organic acid suitable for ingestion such as citric acid or acetic acid and by extracting minerals from the coral by the action of said organic acid.

9 Claims, No Drawings

FOOD SUPPLEMENT COMPRISING A MINERAL COMPLEX AND A METHOD FOR ITS PRODUCTION

FIELD OF THE INVENTION

This invention relates to a food supplement comprising a mineral complex containing calcium, magnesium and other minerals, and a method for its production.

DESCRIPTION OF THE PRIOR ART

A food supplement comprising a mineral complex which is produced from coral and can be used in order to supplement the human body with minerals such as calcium, magnesium and tie like, has been disclosed previously in Japanese Patent Application Laid Open No. 125676/1982. The said mineral complex comprises powdered coral produced by the pulverization of coral, which is then heat-treated at a temperature ranging from 500° to 2000° C. as appropriate, or preferably the powdered coral may be sprayed with water vapor at a temperature of at least 100° C.

In order to produce said mineral complex according to the prior art, a furnace for heat-treatment of the coral and a pulverizer to crush the heat-treated coral are necessary, therefore much investment in terms of facilities is required for such production. Moreover, such production necessitates the ability to control heating temperatures and heating time as well as crushing of the heat-treated coral, resulting in a large labor cost. Due to high production costs, therefore, the conventional food supplement comprising a mineral complex and produced from coral as a raw material, is expensive.

SUMMARY OF THE INVENTION

The present invention substantially resolves these drawbacks. The principal objective of the present invention is to provide a low-priced food supplement comprising a mineral complex, using coral as a raw material.

The present invention further provides for a production process to simply and effectively produce a food supplement comprising a mineral complex using coral as a raw material.

To achieve these objectives, in the present invention, coral is soaked in an aqueous solution of an organic acid which is suitable for ingestion. Such organic acids include citric acid, acetic acid, and the like. Thus, minerals contained within the coral can be extracted by the action of the organic acid.

The supernatant or precipitate is then collected from the solution wherein the coral is soaked. Both said supernatant and precipitate can be used as the mineral complex provided for by the present invention.

Said supernatant can be used as the mineral complex in a liquid form without any further processing. It can however be further processed into powder form by evaporating the water. Alternatively, said precipitate can be dried and the powder used as the mineral complex.

Thus, according to the present invention, the food supplement comprising a mineral complex can be obtained at a reasonably low cost from coral because it dispenses with the need for special production equipment and because the actual production process is so simple and effective.

DETAILED DESCRIPTION OF THE INVENTION

Citric acid was prepared, as an example of an organic acid suitable for ingestion. 160 grams of citric acid was added to 1 liter of water and the mixture agitated to solubilize the citric acid.

1 kg of coral was placed into said citric acid solution and soaked for 24 hours. The pH of the solution immediately after coral was placed in the solution was strongly acidic but after 5 to 6 hours of the coral soaking in it, the acidity of the solution had disappeared. This was probably due to neutralization of the citric acid by the alkaline coral. At this time point, the colour of the coral was bleached relative to its original colour.

After soaking for 24 hours, the coral was removed from the acid solution. When the acid solution was left to stand after removal of coral, all suspended materials precipitated and settled within 15 minutes, leaving a clear supernatant.

The supernatant and precipitate were removed separately from the resulting solution. Said supernatant may be used as food supplement in the form of a liquid mineral complex without further processing. Said precipitate may be dried, and then used as a food supplement in the form of a powder mineral complex.

Analytical tests were performed on the liquid mineral complex from the supernatant and the powder mineral complex from the precipitate obtained as described above.

The components of the mineral complex were analyzed by the methods shown in the following table:

| Component | Test Method |
|---|---|
| Calcium (Ca) | Atomic absorption spectrometry |
| Magnesium (Mg) | Atomic absorption spectrometry |
| Sodium (Na) | Atomic absorption spectrometry |
| Potassium (K) | Flame photometry |
| Silica ($SiO_2$) | Molybdenum blue method |
| Silicon (Si) | Molybdenum blue method |
| Citric acid | Ion chromatography |

The following results were generated from said tests.

| Component | Liquid mineral complex (mg/L) | Powder mineral complex (mg/g) |
|---|---|---|
| (Ca) Calcium | 470 | 170 |
| (Mg) Magnesium | 1100 | 10 |
| (Na) Sodium | 190 | 1.2 |
| (K) Potassium | 7.0 | 0.056 |
| ($SiO_2$) Silica | 26 | — |
| (Si) Silicon | — | 0.13 |
| Citric acid | <10 | — |

As shown in the above table, the tests showed that the liquid mineral complex contained as much as 1100 mg/L of magnesium, 470 mg/L of calcium, 190 mg/L of sodium and other minerals, and that the powder mineral complex contained 170 mg/g of calcium, 10 mg/g of magnesium, 1.2 mg/g of sodium and other minerals.

The minerals contained in the liquid mineral complex and the powder mineral complex, are those extracted from the coral by the action of citric acid.

Generally, the higher the concentration of citric acid, the greater the amount of minerals extracted. Also, the longer the soaking time of the coral, the greater the amount of minerals extracted.

If, however, the concentration of citric acid is too high, the period of time required for neutralization by the coral is increased and in addition the coral pieces may gather in the citric acid solution. The citric acid solution is preferably prepared by dissolving 150 to 250 grams of citric acid per liter of water. The soaking time of coral is set essentially by the time required for the completion of neutralization of the citric acid solution.

As described above, the mineral complex containing a large amount of calcium, magnesium, and other minerals can be produced by the simple process of soaking coral in a citric acid solution. Said method requires no costly production equipment and the process is very simple and cost-effective.

Citric acid, acetic acid and similar acids can be used as the organic acids, and in all cases the production process is the same as for citric acid. The optimal concentration of acetic acid is similar to that of citric acid.

Furthermore, the liquid mineral complex may be converted into a powder mineral complex by water evaporation.

The food supplement comprising a mineral complex produced as described above can improve taste and enhance metabolism when used as food additive.

The mineral complex according to the present invention mitigates fatty acid contained in food when it is added to the raw materials for processed foods such as pizza, cake, mayonnaise, milk, etc. and therefore provides a pleasant taste.

The combination of the mineral complex with fat makes a mixture which has a nature not to be absorbed through the human intestines. The mineral complex, therefore, prevents the human body from getting corpulent.

Either the liquid mineral complex or the powder mineral complex may be used as a food supplement depending on physical property of foods to which the supplement is to be added.

The powder mineral complex can be used for foodstuffs after being dissolved in water. The exact amount of the mineral complex added to foodstuffs can be estimated by considering the difference in mineral content between the liquid mineral complex and the powder mineral complex.

I claim:

1. A food supplement comprising a mineral complex which comprises minerals extracted from coral, wherein said coral is not a ground material, by soaking the coral in an organic acid solution which is suitable for ingestion to form a resultant soaking solution comprising a supernatant and a precipitate; and separating at least one component, selected from the group consisting of supernatant and precipitate, from the other components of the soaking solution, and wherein said at least one component is employed as a food supplement.

2. The food supplement of claim 1 wherein said organic acid is either citric acid or acetic acid.

3. The food supplement of claim 1 wherein said mineral complex is the supernatant of the soaking solution containing minerals extracted from said coral, or an evaporate thereof.

4. The food supplement of claim 1 wherein said mineral complex is the precipitate separated from the soaking solution which contains minerals extracted from said coral.

5. A method of producing a food supplement comprising the steps of:

soaking coral in a solution of an organic acid suitable for ingestion to form a resultant soaking solution comprising a supernatant and a precipitate: and separating at least one component, selected from the group consisting of supernatant and precipitate, from the other components of the soaking solution;

wherein said coral is not a ground material.

6. The method of claim 5 wherein said organic acid is either citric acid or acetic acid.

7. The method of claim 5 comprising separating the supernatant from the soaking solution containing minerals extracted from said coral.

8. The method of claim 7 further comprising evaporating water from said supernatant.

9. The method of claim 5 comprising separating the precipitate from the soaking solution containing minerals extracted from said coral.

* * * * *